US012808812B2

(12) United States Patent
Jung et al.

(10) Patent No.: US 12,808,812 B2
(45) Date of Patent: Nov. 24, 2026

(54) DEFECT INSPECTION APPARATUS

(71) Applicants: Samsung Display Co., LTD., Yongin-si (KR); MU-TECHKOREA CO., LTD., Seoul (KR)

(72) Inventors: Youngil Jung, Yongin-si (KR); Sangbin Park, Seoul (KR); Kuksuk Kim, Uiwang-si (KR); Joongeol Kim, Yongin-si (KR); Hyeongmin Ahn, Yongin-si (KR); Myeongseon Eom, Bupyeong-gu (KR); Sangkyu Lim, Seoul (KR); Yongchae Im, Yongin-si (KR); Hun So, Yongin-si (KR); Sungjin Jo, Yongin-si (KR)

(73) Assignees: SAMSUNG DISPLAY CO., LTD., Gyeonggi-Do (KR); MU-TECHKOREA CO., LTD., Seoul (KR)

( * ) Notice: Subject to any disclaimer, the term of this patent is extended or adjusted under 35 U.S.C. 154(b) by 80 days.

(21) Appl. No.: 18/882,143

(22) Filed: Sep. 11, 2024

(65) Prior Publication Data

US 2025/0085231 A1 Mar. 13, 2025

(30) Foreign Application Priority Data

Sep. 12, 2023 (KR) ........................ 10-2023-0121384

(51) Int. Cl.
*G01N 21/88* (2006.01)
*G01N 21/95* (2006.01)

(52) U.S. Cl.
CPC ..... *G01N 21/8806* (2013.01); *G01N 21/9501* (2013.01); *G01N 2021/8816* (2013.01); *G01N 2021/8822* (2013.01)

(58) Field of Classification Search
CPC ........... G01N 21/8806; G01N 21/9501; G01N 2021/8816; G01N 2021/8822
See application file for complete search history.

(56) References Cited

U.S. PATENT DOCUMENTS 9,606,069 B2 3/2017 Nesbitt
9,726,615 B2 8/2017 Huang et al.
(Continued)

FOREIGN PATENT DOCUMENTS

CN 104279456 A * 1/2015 .............. F21V 19/00
JP 2017067730 A * 4/2017
(Continued)

*Primary Examiner* — Michael A Lyons
(74) *Attorney, Agent, or Firm* — CANTOR COLBURN LLP

(57) ABSTRACT

A defect inspection apparatus includes a first unit, a second unit, and a third unit which respectively irradiate first, second, and third inspection lights to the sample holder, a camera including a single image sensor which generates an image of a sample, which moves linearly on the sample holder, using time delay integration, and a detector which detects defects of the sample based on an image provided by the camera, where the first, second, and the third inspection lights are simultaneously irradiated to the sample holder, and where the single image sensor includes first, second, and third sections, the first section which generates an image of the sample taken by the first inspection light, the second section which generates an image of the sample taken by the second inspection light, and the third section which generates an image of the sample taken by the third inspection light.

14 Claims, 11 Drawing Sheets

(56) References Cited

U.S. PATENT DOCUMENTS

| | | | | |
|---|---|---|---|---|
| 10,600,173 | B2 | 3/2020 | Park et al. | |
| 10,705,026 | B2 | 7/2020 | Zeng et al. | |
| 2002/0105636 | A1* | 8/2002 | Okawauchi | G01N 21/8422 356/51 |
| 2012/0320373 | A1* | 12/2012 | Oshima | G01N 21/47 356/237.2 |
| 2016/0041092 | A1* | 2/2016 | Urano | G01N 21/95623 356/237.5 |
| 2021/0360140 | A1* | 11/2021 | Katzir | H04N 23/74 |

FOREIGN PATENT DOCUMENTS

| | | | |
|---|---|---|---|
| KR | 101733197 | B1 | 5/2017 |
| KR | 102027364 | B1 | 10/2019 |
| KR | 102241899 | B1 | 4/2021 |
| KR | 1020210069730 | A | 6/2021 |
| KR | 102345447 | B1 | 12/2021 |

* cited by examiner

DEFECT INSPECTION APPARATUS

This application claims priority to Korean Patent Application No. 10-2023-0121384, filed on Sep. 12, 2023, and all the benefits accruing therefrom under 35 U.S.C. § 119, the content of which in its entirety is herein incorporated by reference.

BACKGROUND

1. Field

Embodiments relate to a structure of a defect inspection apparatus.

2. Description of the Related Art

An apparatus for capturing a sample using a camera and inspecting defects of the sample is being variously used.

SUMMARY

However, as a structure of a sample to be inspected becomes increasingly sophisticated, such as high-resolution displays, the time desired to detect defects using an inspection apparatus increases, and there are spatial limitations in designing the structure of a defect inspection apparatus.

Embodiments include a structure of a defect inspection apparatus. The above-mentioned feature is just an example, and the disclosure is not limited thereto.

Additional features will be set forth in part in the description which follows and, in part, will be apparent from the description, or may be learned by practice of the presented embodiments of the disclosure.

In an embodiment of the disclosure, a defect inspection apparatus includes a first unit which irradiates first inspection light to a sample holder, a second unit which irradiates second inspection light to the sample holder, a third unit which irradiates third inspection light to the sample holder, a camera including a single image sensor which generates an image of a sample using time delay integration, the sample being disposed on the sample holder and moving linearly, and a detector which detects defects of the sample based on an image provided by the camera, where the first inspection light, the second inspection light, and the third inspection light are simultaneously irradiated to the sample holder, and where the single image sensor includes a first section, a second section, and a third section, the first section generating an image of the sample taken by the first inspection light, the second section generating an image of the sample taken by the second inspection light, and the third section generating an image of the sample taken by the third inspection light.

In an embodiment, the first unit may include a first light source which emits first light, a first shielding plate which is disposed on a progression path of the first light from the first light source toward the sample holder, and blocks a part of the first light, and a first spatial filter which is disposed on the progression path of the first light and disposed between the first shielding plate and the sample holder.

In an embodiment, the second unit may include a second light source which emits second light, a second shielding plate which is disposed on a progression path of the second light from the second light source toward the sample holder, and blocks a part of the second light, and a second spatial filter disposed on the progression path of the second light and disposed between the second shielding plate and the sample holder.

In an embodiment, the third unit may include a third light source which emits third light, a third shielding plate which is disposed on a progression path of the third light from the third light source toward the sample holder, and blocks a part of the third light, and a third spatial filter disposed on the progression path of the third light and disposed between the third shielding plate and the sample holder.

In an embodiment, an irradiation region of the first inspection light, an irradiation region of the second inspection light, and an irradiation region of the third inspection light may be different from each other by the first shielding plate, the second shielding plate, and the third shielding plate, respectively.

In an embodiment, the irradiation region of the first inspection light, the irradiation region of the second inspection light, and the irradiation region of the third inspection light may not overlap each other on the sample holder.

In an embodiment, each of the first shielding plate, the second shielding plate, and the third shielding plate may include a non-reflective coated plate.

In an embodiment, the first spatial filter, the second spatial filter, and the third spatial filter may respectively include apertures of different shapes.

In an embodiment, the defect inspection apparatus may further include at least one lens group disposed between the first to third units and the sample holder, where each of the first inspection light, the second inspection light, and the third inspection light may pass through the at least one lens group and be irradiated toward the sample holder.

In an embodiment, the defect inspection apparatus may further include a sensor-side optical filter through which light reflected from a surface of the sample among the first inspection light, light reflected from the surface of the sample among the second inspection light, and light reflected from the surface of the sample among the third inspection light pass, where the sensor-side optical filter may be adjacent to the camera.

In an embodiment, the light reflected from the surface of the sample among the first inspection light, the light reflected from the surface of the sample among the second inspection light, and the light reflected from the surface of the sample among the third inspection light may be bent by a beam splitter to progress toward the sensor-side optical filter.

In an embodiment, the camera may generate a first image of the sample based on a signal obtained from the first section, generate a second image of the sample based on a signal obtained from the second section, and generate a third image of the sample based on a signal obtained from the third section.

In an embodiment, when a defect is included in the sample, an image of the defect included in the first image, an image of the defect included in the second image, and an image of the defect included in the third image may be different from each other.

In an embodiment, the first image may include an image in which the defect appears relatively bright, and surroundings of the defect appears relatively dark, the second image may include an image in which the defect appears relatively dark, and surroundings of the defect appears relatively bright, and the third image may include an image in which the defect appears relatively three-dimensional.

In an embodiment, the detector may detect a position of the defect based on the first image, the second image, and the third image.

In an embodiment, the single image sensor may further include a dummy section disposed between two adjacent sections among the first section, the second section, and the third section.

BRIEF DESCRIPTION OF THE DRAWINGS

The above and other features and advantages of illustrative embodiments of the disclosure will be more apparent from the following description taken in conjunction with the accompanying drawings, in which.

DETAILED DESCRIPTION

Figure 1:
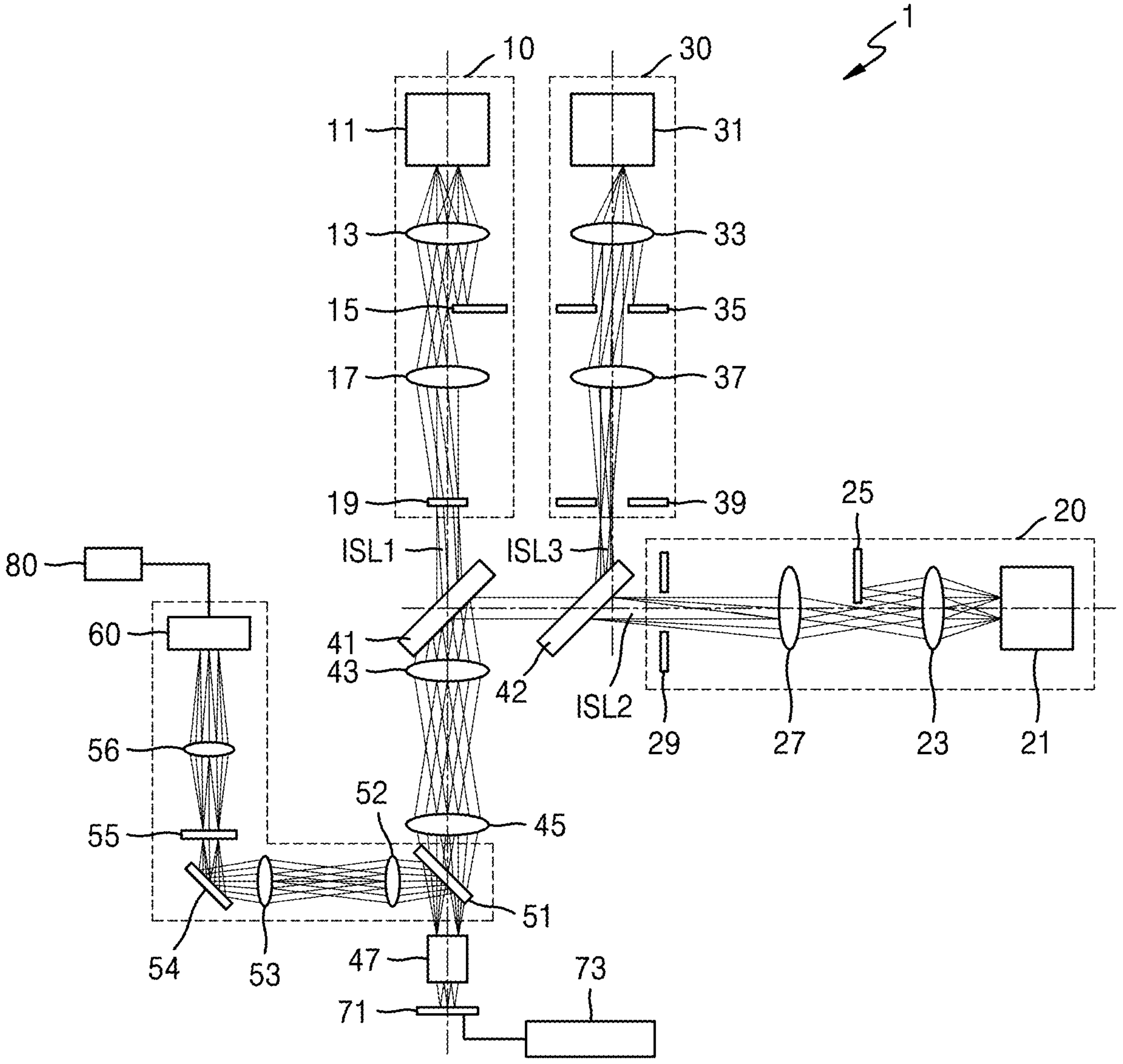
FIG. 1 is a schematic view of an embodiment of a structure of a defect inspection apparatus.

Reference will now be made in detail to embodiments, illustrative embodiments of which are illustrated in the accompanying drawings, where like reference numerals refer to like elements throughout. In this regard, the illustrated embodiments may have different forms and should not be construed as being limited to the descriptions set forth herein. Accordingly, the embodiments are merely described below, by referring to the drawing figures, to explain features of the description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, illustrative embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, where like reference numerals refer to like elements throughout and a repeated description thereof is omitted.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

It will be further understood that, when a layer, region, or element is referred to as being "on" another layer, region, or element, it can be directly or indirectly on the other layer, region, or element. That is, for example, intervening layers, regions, or elements may be present.

Sizes of elements in the drawings may be exaggerated or reduced for convenience of explanation. As an example, the size and thickness of each element shown in the drawings are arbitrarily represented for convenience of description, and thus, the disclosure is not necessarily limited thereto.

In the case where an illustrative embodiment may be implemented differently, a predetermined process order may be performed in the order different from the described order. As an example, two processes successively described may be simultaneously performed substantially and performed in the opposite order.

In the specification, "A and/or B" means A or B, or A and B. In addition, "at least one of A and B" or "at least one of A or B" means A or B, or A and B.

It will be understood that when a layer, region, or element is referred to as being "connected" to another layer, region, or element, it may be "directly connected" to the other layer, region, or element or may be "indirectly connected" to the other layer, region, or element with another layer, region, or element located therebetween. For example, it will be understood that when a layer, region, or element is referred to as being "electrically connected" to another layer, region, or element, it may be "directly electrically connected" to the other layer, region, or element or may be "indirectly electrically connected" to the other layer, region, or element with another layer, region, or element interposed therebetween.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

Figure 2:
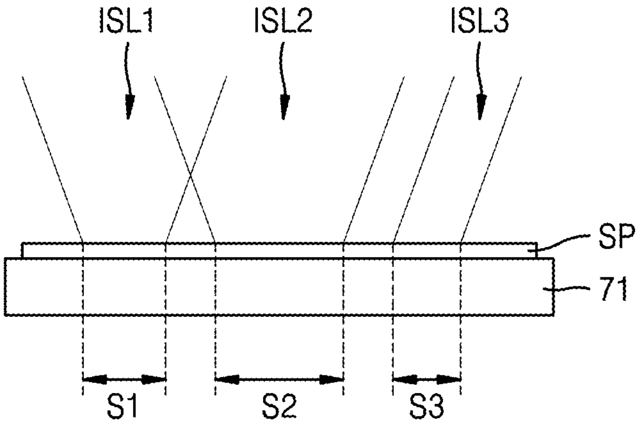
FIG. 2 is a schematic view of first to third inspection light incident to a sample holder of FIG. 1.
Figure 3:
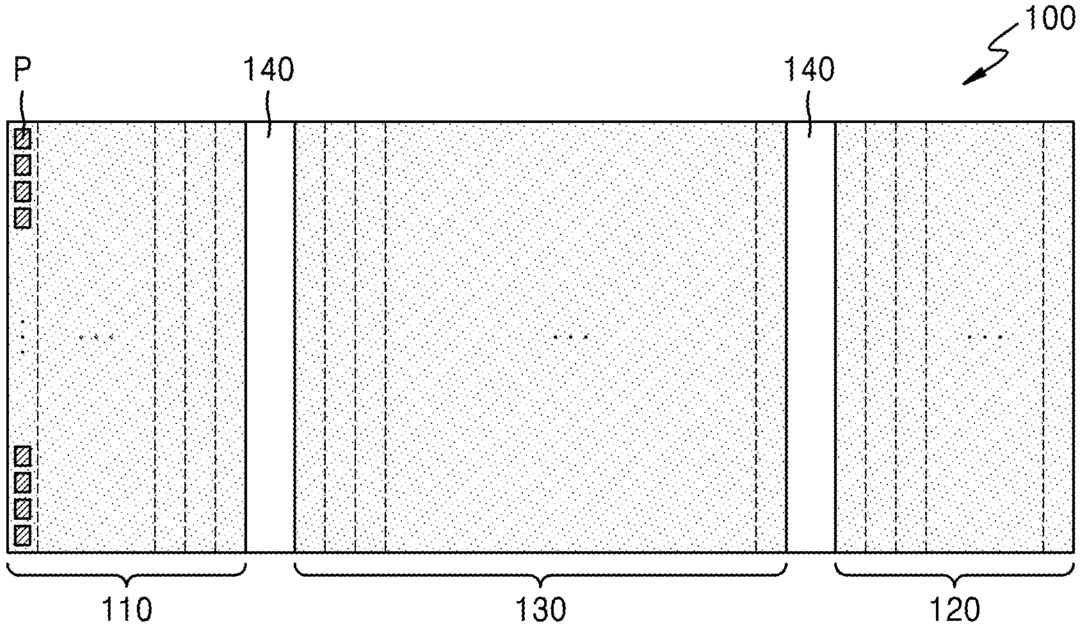
FIG. 3 is a plan view of an image sensor provided in a camera of FIG. 1.

FIG. 1 is a schematic view of an embodiment of a structure of a defect inspection apparatus 1, FIG. 2 is a schematic view of first to third inspection light incident to a sample holder of FIG. 1, and FIG. 3 is a plan view of an image sensor provided to a camera of FIG. 1.

Referring to FIG. 1, the defect inspection apparatus 1 (also referred to as an inspection apparatus, hereinafter) is an apparatus for inspecting a defect of a sample SP that linearly moves, and may pick up a plurality of images of the sample SP to inspect defects using the images.

The inspection apparatus 1 may include a first unit (also referred to as a first light emitter) 10 which outputs first inspection light ISL1, a second unit (also referred to as a second light emitter) 20 which outputs second inspection light ISL2, and a third unit (also referred to as a third light emitter) 30 which outputs third inspection light ISL3. The first inspection light ISL1, the second inspection light ISL2, and the third inspection light ISL3 respectively output from the first unit 10, the second unit 20, and the third unit 30 may be simultaneously irradiated toward a sample holder 71. The sample SP (refer to FIG. 2) may be disposed on the sample holder 71, and the sample holder 71 may be linearly moved by a moving part 73. Because the sample SP (refer to FIG. 2) is fixedly disposed on the sample holder 71, and the sample holder 71 is linearly moved by the moving part 73, the linear movement of the sample SP (refer to FIG. 2) may represent the linear movement of the sample holder 71 in the specification.

The first inspection light ISL1 output from the first unit 10 may pass through at least one lens group, e.g., a first lens group 43 and a second lens group 45, disposed between the first to third units 10, 20 and 30 and the sample holder 71 and be irradiated toward the sample holder 71. A first beam splitter 41 may be disposed between the first unit 10 and the first lens group 43, and the first inspection light ISL1 may pass through the first beam splitter 41 and proceed toward the first lens group 43. The first inspection light ISL1 may proceed toward the sample holder 71 on a coaxial line with the optical axes of the first lens group 43 and the second lens group 45. Each of the first lens group 43 and the second lens group 45 may include one or more lenses.

The second inspection light ISL2 output from the second unit 20 may pass through the first lens group 43 and the second lens group 45, and be irradiated toward the sample holder 71. A second beam splitter 42 and the first beam splitter 41 may be disposed between the second unit 20 and the first lens group 43.

The second inspection light ISL2 may be bent by the first beam splitter 41. In an embodiment, the second inspection light ISL2 may pass through the second beam splitter 42, proceed toward the first beam splitter 41, and be reflected by the first beam splitter 41 to proceed toward the first lens group 43. The second inspection light ISL2 may proceed toward the sample holder 71 on a coaxial line with the optical axes of the first lens group 43 and the second lens group 45.

The third inspection light ISL3 output from the third unit 30 may pass through the first lens group 43 and the second lens group 45, and be irradiated toward the sample holder 71. The second beam splitter 42 and the first beam splitter 41 may be disposed between the third unit 30 and the first lens group 43.

The third inspection light ISL3 may be bent by the second beam splitter 42 and the first beam splitter 41. The third inspection light ISL3 may be reflected by the second beam splitter 42, proceed toward the first beam splitter 41, and be reflected by the first beam splitter 41 to proceed toward the first lens group 43. By the second beam splitter 42 and the first beam splitter 41, the third inspection light ISL3 may proceed toward the sample holder 71 on a coaxial line with the optical axes of the first lens group 43 and the second lens group 45.

The first inspection light ISL1, the second inspection light ISL2, and the third inspection light ISL3 may be coaxial light that proceeds toward the sample holder 71 on a coaxial line with the optical axes of the first lens group 43 and the second lens group 45.

The first inspection light ISL1, the second inspection light ISL2, and the third inspection light ISL3 may be respectively and simultaneously irradiated toward the sample holder 71, and irradiated to different regions on the sample holder 71. In an embodiment, as shown in FIG. 2, the first inspection light ISL1 may be irradiated to a first region S1 of the sample holder 71, the second inspection light ISL2 may be irradiated to a second region S2 of the sample holder 71, and the third inspection light ISL3 may be irradiated to a third region S3 of the sample holder 71. The first region S1, which is an irradiation region of the first inspection light ISL1, the second region S2, which is an irradiation region of the second inspection light ISL2, and the third region S3, which is an irradiation region of the third inspection light ISL3, may be different from each other by the first shielding plate 15, the second shielding plate 25, and the third shielding plate 35, respectively. In an embodiment, the first region S1, the second region S2, and the third region S3 may be adjacent to each other and may not overlap each other.

The sample SP may pass through the first region S1, the second region S2, and the third region S3 due to linear movement of the sample holder 71. The sample holder 71 moves linearly, while the positions of regions irradiated by the first inspection light ISL1, second inspection light ISL2, and third inspection light ISL3, that is, the first region S1, the second region S2, and the third region S3, are fixed. In an embodiment, in the case where the sample SP proceeds in a horizontal direction of FIG. 2, the sample SP may pass through the third region S3, the second region S2, and the first region S1 at different times.

As the sample SP passes through the third region S3, the second region S2, and the first region S1, light reflected by a surface of the sample SP may pass through an object part 47 and a sensor-side optical filter 55 shown in FIG. 1 and be directed toward a camera 60. In an embodiment, light reflected by the sample SP may pass through the object part 47, be bent by a third beam splitter 51 to proceed to a third lens group 52 and a fourth lens group 53, be bent by an image mirror 54, may pass through the sensor-side optical filter 55 and an image tube lens 56, and be directed to the camera 60. The sensor-side optical filter 55 may be adjacent to the camera 60.

The camera 60 includes a single image sensor, and the image sensor may include a plurality of sections receiving different light. In an embodiment, as shown in FIG. 3, an image sensor 100 may include a first section 110, a second section 120, and a third section 130 which respectively have preset areas and are spaced apart from each other.

Each of the first section 110, the second section 120, and the third section 130 may include a plurality of pixels which may receive light. In an embodiment, the first section 110 includes a plurality of pixel lines, and each pixel line may include pixels P disposed in one direction. Similarly, each of the second section 120 and the third section 130 may have a structure of pixel lines. In an embodiment, each pixel P may be approximately 5 micrometers (μm)×5 micrometers (μm) ((width)×(height)). However, the above-mentioned numbers are an example and the size of the pixel may be variously changed.

The image sensor 100 may include a dummy section 140 which corresponds to a gap between two adjacent sections among the first section 110, the second section 120, and the third section 130. In an embodiment, the image sensor 100 may include one dummy section 140 between the first section 110 and the second section 120, and another dummy section 140 between the second section 120 and the third section 130. The dummy section 140 includes pixels P but may not generate an image (or a signal) for inspecting defects of the sample SP.

The first section 110 may scan the sample SP by receiving light reflected by the sample SP using the first inspection light ISL1 (refer to FIG. 2), the second section 120 may scan the sample SP by receiving light reflected by the sample SP using the second inspection light ISL2 (refer to FIG. 2), and the third section 130 may scan the sample SP by receiving light reflected by the sample SP using the third inspection light ISL3 (refer to FIG. 2). Light obtained by the second inspection light ISL2 (refer to FIG. 2) and the third inspection light ISL3 (refer to FIG. 2) may not be received by the first section 110, light obtained by the third inspection light ISL3 (refer to FIG. 2) and the first inspection light ISL1 (refer to FIG. 2) may not be received by the second section 120, and light obtained by the first inspection light ISL1 (refer to FIG. 2) and the second inspection light ISL2 (refer to FIG. 2) may not be received by the third section 130.

The image sensor 100 may generate an image of the sample SP moving on the sample holder 71 using time delay integration ("TDI"). The first section 110 may generate a first image, the second section 120 may generate a second image, and the third section 130 may generate a third image with respect to the same sample SP. When the defect is included in the sample SP, an image of the defect included in the first image, an image of the defect included in the second image, and an image of the defect included in the third image may be different from each other. Although there is the same defect in the sample SP, an image of the defect included in the first image, an image of the defect included in the second image, and an image of the defect included in the third image may be different from each other.

The first image obtained by the first inspection light ISL1 output from the first unit 10 may be formed through light received by the first section 110. In an embodiment, in the first image, a defect of the sample SP may appear relatively bright, and surroundings of the defect may appear relatively dark.

The second image obtained by the second inspection light ISL2 output from the second unit 20 may be formed through light received by the second section 120. In an embodiment, in the second image, a defect of the sample SP may appear relatively dark, and surroundings of the defect may appear relatively bright.

The third image obtained by the third inspection light ISL3 output from the third unit 30 may be formed through light received by the third section 130. In an embodiment, in the third image, a defect of the sample SP may appear relatively three-dimensional.

As shown in FIG. 2, as the sample SP passes through the first region S1, the second region S2, and the third region S3, the single image sensor 100 may generate a plurality of images, e.g., the first image, the second image, and the third image through the first section 110, the second section 120, and the third section 130.

The above-described images, e.g., the first image, the second image, and the third image may be provided to the detector 80, and the detector 80 may detect a defect of the sample SP based on the first to third images.

Figure 4A:
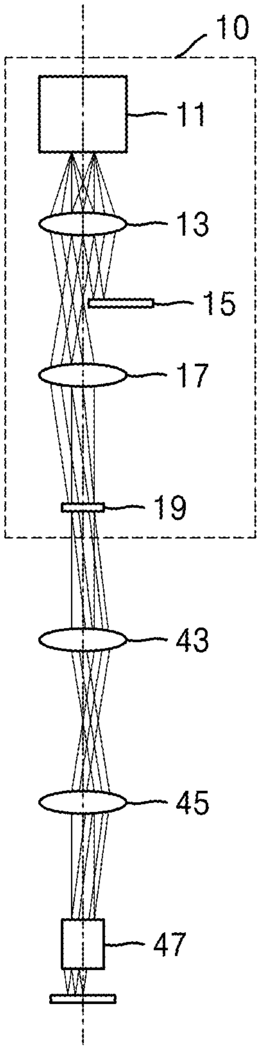
FIG. 4A is a schematic view of a structure from a first unit to a sample holder of FIG. 1.
Figure 4B:
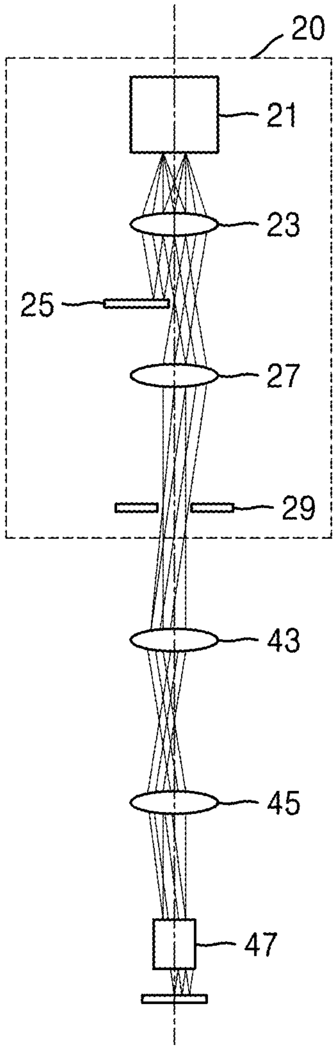
FIG. 4B is a schematic view of a structure from a second unit to the sample holder of FIG. 1.
Figure 4C:
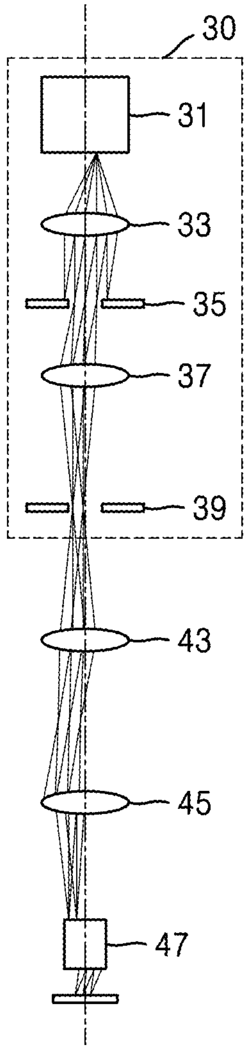
FIG. 4C is a schematic view of a structure from a third unit to the sample holder of FIG. 1.
Figure 5A:
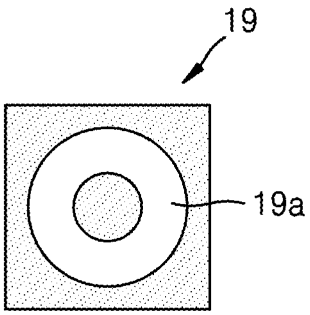
FIG. 5A is a schematic plan view of an embodiment of a first spatial filter.
Figure 5B:
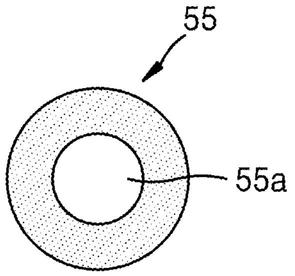
FIG. 5B is a schematic plan view of an embodiment of a sensor-side optical filter.
Figure 5C:
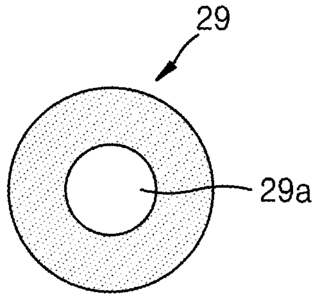
FIG. 5C is a schematic plan view of an embodiment of a second spatial filter.
Figure 5D:
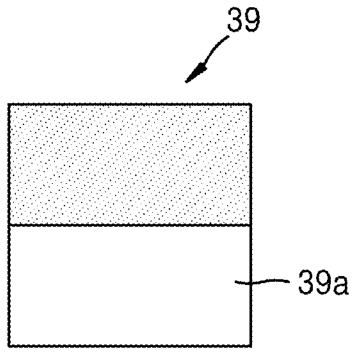
FIG. 5D is a schematic plan view of an embodiment of a third spatial filter.

FIG. 4A is a schematic view of a structure from a first unit to a sample holder of FIG. 1, FIG. 4B is a schematic view of a structure from a second unit to the sample holder of FIG. 1, and FIG. 4C is a schematic view of a structure from a third unit to the sample holder of FIG. 1. In addition, FIG. 5A is a schematic plan view of an embodiment of a first spatial filter, FIG. 5B is a schematic plan view of an embodiment of a sensor-side optical filter, FIG. 5C is a schematic plan view of an embodiment of a second spatial filter, and FIG. 5D is a schematic plan view of an embodiment of a third spatial filter. For convenience of description, FIGS. 4A to 4C show elements with the first and second beam splitters 41 and 42 of FIG. 1 omitted.

Referring to FIGS. 1 to 4A, the first unit 10 may include a first shielding plate 15 disposed between a first light source 11 and a first spatial filter 19. In an embodiment, the first light source 11 may emit first light (e.g., white light). The first unit 10 may include a 1-1 lens group 13 between the first light source 11 and the first shielding plate 15, and a 1-2 lens group 17 between the first shielding plate 15 and the first spatial filter 19. In other words, the first unit 10 may include the 1-1 lens group 13, the first shielding plate 15, the 1-2 lens group 17, and the first spatial filter 19 disposed on a progression path of the first light emitted from the first light source 11 toward the sample holder 71. The first spatial filter 19 may be disposed between the first shielding plate 15 and the sample holder 71.

Each of the 1-1 lens group 13 and the 1-2 lens group 17 may include one or more lenses. The first light emitted from the first light source 11 may pass through the 1-1 lens group 13, pass through the first shielding plate 15 between the 1-1 lens group 13 and the 1-2 lens group 17, and proceed to the 1-2 lens group 17. The first shielding plate 15 may block a portion of the first light, e.g., a portion of the first light that passes through the 1-1 lens group 13, and transmit the rest of the first light. The first shielding plate 15 may include a non-reflection coated plate. In an embodiment, the first shielding plate 15 may include a non-reflection coated stainless steel ("SUS") plate. The position and/or the size of the first region S1 described above with reference to FIG. 2 may be controlled by the first shielding plate 15.

The first light that passes through the first shielding plate 15 and the 1-2 lens group 17 may pass through the first spatial filter 19. In an embodiment, as shown in FIG. 5A, the first spatial filter 19 may be a filter in which a loop-shaped (ring-shaped) aperture 19*a* is defined. The first light that passes through the first spatial filter 19, that is, the first inspection light ISL1 (refer to FIG. 1) may pass through the first beam splitter 41 (refer to FIG. 1), proceed toward the first lens group 43 and the second lens group 45, and pass through the third beam splitter 51 (refer to FIG. 1).

As described above with reference to FIG. 2, the first inspection light ISL1 is irradiated to the first region S1 of the sample holder 71. Because the sample SP disposed on the sample holder 71 is linearly moved by the moving part 73, an image of the sample SP may be recorded in real-time in a portion (e.g., the first section 110 in FIG. 3) of the image sensor 100 (refer to FIG. 3) of the camera 60 according to the movement of the sample SP.

The first inspection light ISL1 irradiated to the sample SP may be reflected by the sample SP. The light reflected by the sample SP may pass through the object part 47 and the sensor-side optical filter 55 and be directed to the camera 60. In an embodiment, the light reflected by the sample SP may pass through the object part 47, the third beam splitter 51, the third lens group 52, the fourth lens group 53, the image mirror 54, the sensor-side optical filter 55, and the image tube lens 56, and be directed to the camera 60.

The sensor-side optical filter 55 may have a structure different from the structure of the first spatial filter 19. As shown in FIG. 5B, the sensor-side optical filter 55 may include a circular aperture 55*a* defined inside a light-blocking region, which has a loop shape (a ring shape). Light that passes through the sensor-side optical filter 55, that is, light including information regarding the sample SP proceeds toward the camera 60 as shown in FIG. 1, and a portion (e.g., the first section 110) of the image sensor 100 (refer to FIG. 3) of the camera 60 may generate the first image using the above-described light.

In the case where there is a defective structure in the sample SP, reflection by the defective structure may be different from the reflection by the normal structure. In an embodiment, light reflected by the defective structure may pass through the object part 47 disposed on the most object side of the inspection apparatus 1, the third beam splitter 51, the third lens group 52, the fourth lens group 53, the image mirror 54, the sensor-side optical filter 55, and the image tube lens 56, and reach a portion (e.g. the first section 110 (refer to FIG. 3)) of the image sensor 100 (refer to FIG. 3) of the camera 60. In the first image generated by the first section 110 (refer to FIG. 3), a defect may appear relatively bright, and the surroundings of the defect may appear relatively dark.

Referring to FIGS. 1 and 4B, the second unit 20 may include a second shielding plate 25 disposed between a second light source 21 and a second spatial filter 29. The second light source 21 may emit second light (e.g., white light). The second unit 20 may include a 2-1 lens group 23 between the second light source 21 and the second shielding plate 25, and a 2-2 lens group 27 between the second shielding plate 25 and the second spatial filter 29. In other words, the second unit 20 may include the 2-1 lens group 23, the second shielding plate 25, the 2-2 lens group 27, and the second spatial filter 29 disposed on a progression path of the second light emitted from the second light source 21. The second spatial filter 29 may be disposed between the second shielding plate 25 and the sample holder 71.

Each of the 2-1 lens group 23 and the 2-2 lens group 27 may include one or more lenses. The second light emitted from the second light source 21 may pass through the 2-1 lens group 23, pass through the second shielding plate 25 between the 2-1 lens group 23 and the 2-2 lens group 27, and proceed to the 2-2 lens group 27. The second shielding plate 25 may be disposed on a progression path of the second light from the second light source 21 toward the sample holder 71. The second shielding plate 25 may block a portion of the second light, e.g., a portion of the second light that passes through the 2-1 lens group 23, and transmit the rest of the second light.

A region shielded by the second shielding plate 25 may be different from a region shielded by the first shielding plate 15. In an embodiment, while the first shielding plate 15 may shield one side region of both side regions around an optical axis, e.g., the right side region of the optical axis in FIG. 4A, the second shielding plate 25 may shield one side region of both side regions around an optical axis, e.g., the left side region of the optical axis in FIG. 4B. The position and/or the size of the second region S2 described above with reference to FIG. 2 may be controlled by the second shielding plate 25. As shown in FIG. 1, the first inspection light ISL1 and the second inspection light ISL2 proceeding toward the sample holder 71 on the coaxial line with the optical axes of the first lens group 43 and the second lens group 45 may be irradiated to different regions by the first shielding plate 15 of the first unit 10 and the second shielding plate 25 of the second unit 20 as shown in FIG. 2. The second shielding plate 25 may be a non-reflection coated metal plate, e.g., a non-reflection coated SUS plate.

The second light that passes through the second shielding plate 25 and the 2-2 lens group 27 may pass through the second spatial filter 29. In an embodiment, the second spatial filter 29 may be a filter defining a circular aperture 29*a* as shown in FIG. 5C. The second light that passes through the second spatial filter 29, that is, the second inspection light ISL2 may proceed toward the first lens group 43 and the second lens group 45 by the second and first beam splitter 42 and 41 (refer to FIG. 1), and pass through the third beam splitter 51 (refer to FIG. 1).

As described above with reference to FIG. 2, the second inspection light ISL2 is irradiated to the second region S2 of the sample holder 71. Because the sample SP disposed on the sample holder 71 is linearly moved by the moving part 73, an image of the sample SP may be recorded in real-time in a portion (e.g., the second section 120 in FIG. 3) of the image sensor 100 (refer to FIG. 3) of the camera 60 according to the movement of the sample SP.

The second inspection light ISL2 irradiated to the sample SP may be reflected by the sample SP. Light reflected by the sample SP may pass through the third beam splitter 51, the third lens group 52, the fourth lens group 53, and the image mirror 54, and proceed toward the sensor-side optical filter 55.

Light that passes through the sensor-side optical filter 55, that is, light including information regarding the sample SP passes through the image tube lens 56, is directed toward the camera 60 as shown in FIG. 1, and a portion (e.g., the second section in FIG. 3) of the image sensor 100 (refer to FIG. 3) of the camera 60 may generate the second image using the above-described light.

In the case where there is a defective structure in the sample SP, reflection by the defective structure different from the reflection by the normal structure may occur. Even though the second light emitted from the second light source 21 is the same light (e.g., white light) as the first light emitted from the first light source 11, because the second light passes through the second spatial filter 29 different from the first spatial filter 19, the second inspection light ISL2 irradiated to the second region S2 may be irradiated at an incident angle different from the incident angle of the first inspection light ISL1.

Accordingly, even though a defect is the same, the second image generated by a portion of the image sensor 100 (FIG. 3), e.g., the second section 120 (FIG. 3), may be different from the first image. In the second image, a defect may appear relatively dark, and surroundings of the defect may appear relatively bright.

Referring to FIGS. 1 and 4C, the third unit 30 may include a third shielding plate 35 disposed between a third light source 31 and a third spatial filter 39. The third light source 31 may emit third light (e.g., white light). The third unit 30 may include a 3-1 lens group 33 between the third light source 31 and the third shielding plate 35, and a 3-2 lens group 37 between the third shielding plate 35 and the third spatial filter 39. In other words, the third unit 30 may include the 3-1 lens group 33, the third shielding plate 35, the 3-2 lens group 37, and the third spatial filter 39 disposed on a progression path of the third light emitted from the third light source 31. The third spatial filter 39 may be disposed between the third shielding plate 35 and the sample holder 71.

Each of the 3-1 lens group 33 and the 3-2 lens group 37 may include one or more lenses. The third light emitted from the third light source 31 may pass through the 3-1 lens group 33, pass through the third shielding plate 35 between the 3-1 lens group 33 and the 3-2 lens group 37, and proceed to the 3-2 lens group 37. The third shielding plate 35 may be disposed on a progression path of the third light from the third light source 31 toward the sample holder 71. The third shielding plate 35 may block a portion of the third light, e.g., a portion of the third light that passes through the 3-1 lens group 33, and transmit the rest of the third light.

A region shielded by the third shielding plate 35 may be different from a region shielded by the second shielding plate 25. In an embodiment, the third shielding plate 35 may transmit a region through which the optical axis passes, and shield the surroundings thereof. The position and/or the size of the third region S3 described above with reference to FIG.

2 may be controlled by the third shielding plate 35. As shown in FIG. 1, the first inspection light ISL1, the second inspection light ISL2, and the third inspection light ISL3 proceeding toward the sample holder 71 on the coaxial line with the optical axes of the first lens group 43 and the second lens group 45 may be irradiated to different regions by the first to third shielding plates 15, 25, and 35 respectively provided to the first to third units 10, 20, and 30 as shown in FIG. 2. The third shielding plate 35 may be a non-reflection coated metal plate, e.g., a non-reflection coated SUS plate.

The third light that passes through the third shielding plate 35 and the 3-2 lens group 37 may pass through the third spatial filter 39. In an embodiment, the third spatial filter 39 may be a filter defining a quadrangular aperture 39*a* as shown in FIG. 5D. The aperture 39*a* of the third spatial filter 39 may be biased to one side. In an embodiment, the third light that passes through the third spatial filter 39, that is, the third inspection light ISL3 may pass through the second and first beam splitters 42 and 41 (refer to FIG. 1) and proceed toward the first lens group 43 and the second lens group 45, and pass through the third beam splitter 51 (refer to FIG. 1).

As described above with reference to FIG. 2, the third inspection light ISL3 is irradiated to the third region S3 of the sample holder 71. Because the sample SP disposed on the sample holder 71 is linearly moved by the moving part 73, an image of the sample SP may be recorded in real-time in a portion (e.g., the third section 130 in FIG. 3) of the image sensor 100 (refer to FIG. 3) of the camera 60 according to the movement of the sample SP.

The third inspection light ISL3 irradiated to the sample SP may be reflected according to the structure of the sample SP. The light reflected by the sample SP may pass through the object part 47 and the sensor-side optical filter 55 and be directed to the camera 60. In an embodiment, the light reflected by the sample SP may pass through the object part 47, the third beam splitter 51, the third lens group 52, the fourth lens group 53, the image mirror 54, the sensor-side optical filter 55, and the image tube lens 56, and be directed to the camera 60.

Light that passes through the sensor-side optical filter 55, that is, light including information regarding the sample SP proceeds toward the camera 60 as shown in FIG. 1, and a portion (e.g., the third section 130 in FIG. 3) of the image sensor 100 (refer to FIG. 3) of the camera 60 may generate the third image using the above-described light.

In the case where there is a defective structure in the sample SP, reflection by the defective structure different from the reflection by the normal structure may occur. Even though the third light emitted from the third light source 31 is the same light (e.g., white light) as the first light and the second light respectively emitted from the first and second light sources 11 and 21, because the third light passes through the third spatial filter 39, the third inspection light ISL3 (refer to FIG. 1) irradiated to the third region S3 may be irradiated at an incident angle different from the incident angles of the first and second inspection light ISL1 and ISL2. In an embodiment, the third inspection light ISL3 (refer to FIG. 1) may be irradiated in an oblique direction with respect to the upper surface of the sample holder 71.

An image generated using the third inspection light ISL3 (refer to FIG. 1), e.g., the third image generated by the third section 130 (refer to FIG. 3) of the image sensor 100 (refer to FIG. 3) may be different from the first image and the second image. In an embodiment, in the third image, a defect may appear relatively three-dimensional.

Figure 6:
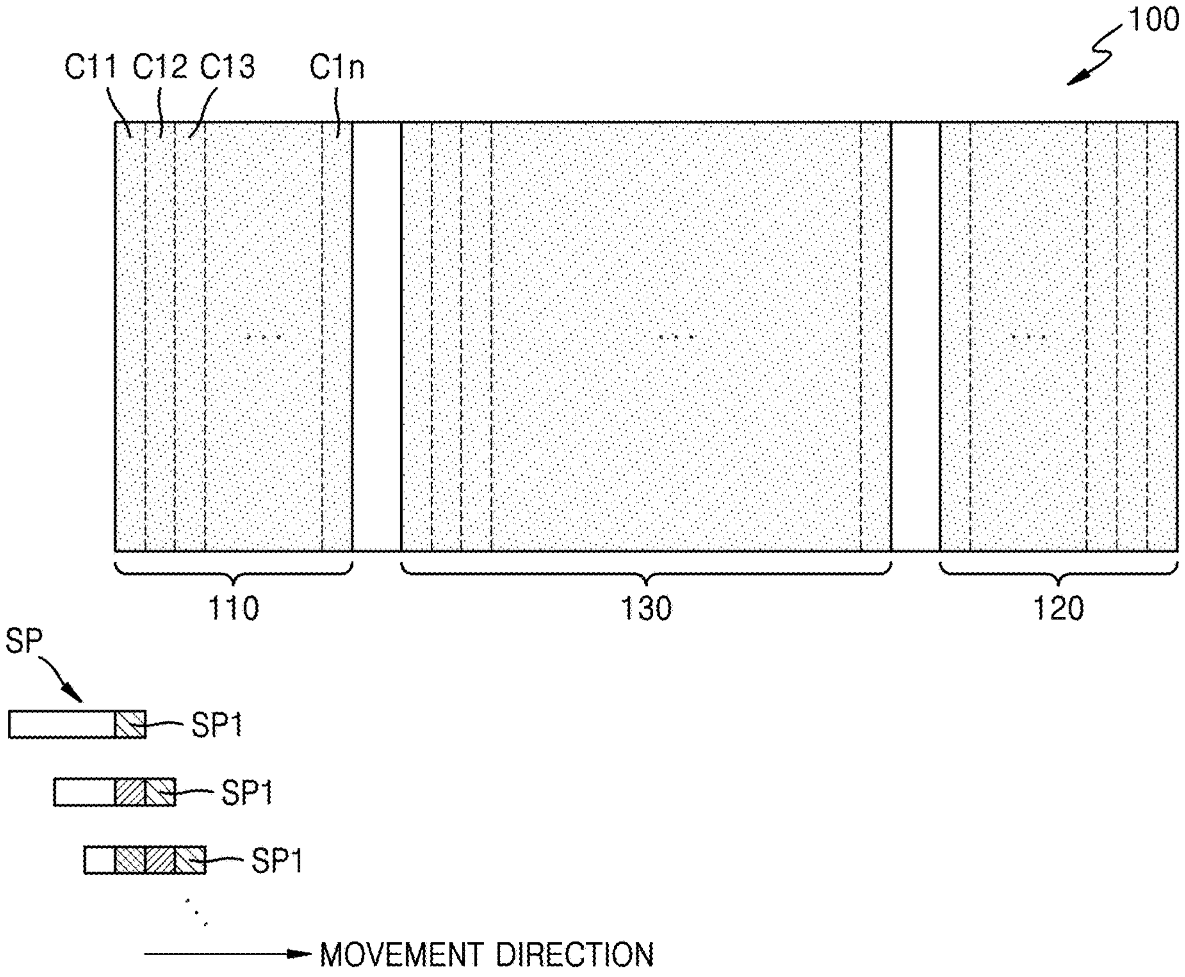
FIG. 6 is a conceptual view for explaining an embodiment of time delay integration (TDI) image generation by an image sensor of a camera of a defect inspection apparatus.

FIG. 6 is a conceptual view for explaining TDI image generation by the image sensor of the camera of a defect inspection apparatus.

Referring to FIG. 6, the first section 110 of the image sensor 100 may include a plurality of pixel lines C11, C12, C13, . . . , C1*n*, where n is a natural number (e.g., n is a positive integer). Each of the pixel lines C11, C12, C13, . . . , C1*n* may be a stage for TDI.

As the sample SP moves linearly, each of the pixel lines C11, C12, C13, . . . , C1*n* may obtain a signal of an image of the sample SP at a different time. In an embodiment, a signal of a first portion SP1 of the sample SP received by the first pixel line C11 at a first time point, a signal of the first portion SP1 of the sample SP received by the second pixel line C12 at a second time point, . . . , a signal of the first portion SP1 of the sample SP received by the n-th pixel line C1*n* at an n-th time point may be accumulated to generate an image of the first portion SP1 of the sample SP. The first image of the entirety of the sample SP may be generated using this method.

Like the first section 110 generate the first image using the TDI, the second section 120 may generate the second image using the TDI, and the third section 130 may generate the third image using the TDI.

It is shown in FIG. 6 that the first to third sections 110, 120, and 130 are spaced apart from each other and are spaced apart from each other in the linear movement direction of the sample SP. In another embodiment, the first to third sections 110, 120, and 130 are spaced apart from each other and may be disposed side-by-side in a direction (e.g., a longitudinal direction in FIG. 6) crossing the linear movement direction of the sample SP, but the disclosure is not limited thereto.

In another embodiment, it is shown that the first to third sections 110, 120, and 130 are spaced apart from each other and are spaced apart from each other in a direction crossing the linear movement direction of the sample SP. In an embodiment, the first to third sections 110, 120, and 130 may be disposed side-by-side in the linear movement direction (e.g., a transverse direction in FIG. 6) of the sample SP. In this case, each stage for the camera 60 to perform the TDI may include a portion of the first section 110, a portion of the second section 120, and a portion of the third section 130.

In a comparative example, in the case of a defect inspection apparatus of a relatively low resolution using an area camera, a distance (also referred to as a working distance, hereinafter) between the camera and a sample may be sufficiently secured, but a camera of a relatively high resolution is desired to inspect a sample SP whose structure is substantially fine as in a display that provides images of a relatively high resolution. In this case, the above-mentioned working distance is reduced, and because the working distance is reduced, it is difficult to secure a space for irradiating the first to third inspection light proceeding toward the sample at different incident angles.

However, in the embodiments described with reference to FIGS. 1 to 6, because inspection light of different conditions, that is, the first to third inspection light ISL1, ISL2 and ISL3 proceeds on a coaxial path with the first and second lens groups 43 and 45, and light reflected by the sample SP proceeds on a coaxial path with the third and fourth lens groups 52 and 53, and is received by the camera 60, a sufficient working distance between the sample SP and the camera 60 may be secured.

In an embodiment, because the first to third units 10, 20, and 30 respectively include the first to third shielding plates 15, 25, and 35, the first to third inspection light ISL1, ISL2, and ISL3 proceeding toward the sample holder 71 on the coaxial path with the first and second lens groups 43 and 45 may be simultaneously irradiated to different regions.

In an embodiment, the single image sensor 100 is divided into a plurality of sections (e.g., the first to third sections 110, 120, and 130) as described with reference to FIG. 3, inspection light of different conditions, that is, the first to third inspection light ISL1, ISL2 and ISL3 are irradiated for each section. Accordingly, a plurality of images of the sample SP may be obtained in a single scan. Therefore, with just one scan, defects of the sample SP may be inspected quickly and accurately.

In an embodiment, because the single image sensor 100 is divided and a plurality of sections generate images, it is easy for the detector 80 to match or extract coordinates of defective positions during the defect inspection. Therefore, defects of the sample SP may be inspected at relatively high speed.

In an embodiment, an apparatus in which a working distance may be sufficiently secured, images of a relatively high resolution may be generated with just one scan of a sample, and defects may be detected in relatively high speed, may be provided. However, this effect is an example, and the disclosure is not limited by this effect.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. A defect inspection apparatus comprising:
a first unit which irradiates first inspection light toward a sample holder;
a second unit which irradiates second inspection light toward the sample holder;
a third unit which irradiates third inspection light toward the sample holder;
a camera including a single image sensor which generates an image of a sample by time delay integration, the sample being disposed on the sample holder and moving linearly, the single image sensor including:
a first section which generates a first image of the sample captured by the first inspection light;
a second section which generates a second image of the sample captured by the second inspection light, and
a third section generates a third image of the sample captured by the third inspection light; and
a detector which detects defects of the sample based on the first image, the second image and the third image provided by the camera,
wherein the first inspection light, the second inspection light, and the third inspection light are simultaneously irradiated to the sample holder.

2. The defect inspection apparatus of claim 1, wherein the first unit includes:
a first light source which emits first light;
a first shielding plate which is disposed on a progression path of the first light from the first light source toward the sample holder, and blocks a part of the first light; and
a first spatial filter disposed on the progression path of the first light and disposed between the first shielding plate and the sample holder,
wherein the second unit includes:
a second light source which emits second light;
a second shielding plate which is disposed on a progression path of the second light from the second light source toward the sample holder, and blocks a part of the second light; and
a second spatial filter disposed on the progression path of the second light and disposed between the second shielding plate and the sample holder, and
wherein the third unit includes:
a third light source which emits third light;
a third shielding plate which is disposed on a progression path of the third light from the third light source toward the sample holder, and blocks a part of the third light; and
a third spatial filter disposed on the progression path of the third light and disposed between the third shielding plate and the sample holder.

3. The defect inspection apparatus of claim 2, wherein an irradiation region of the first inspection light, an irradiation region of the second inspection light, and an irradiation region of the third inspection light are different from each other by the first shielding plate, the second shielding plate, and the third shielding plate, respectively.

4. The defect inspection apparatus of claim 3, wherein the irradiation region of the first inspection light, the irradiation region of the second inspection light, and the irradiation region of the third inspection light do not overlap each other on the sample holder.

5. The defect inspection apparatus of claim 2, wherein each of the first shielding plate, the second shielding plate, and the third shielding plate includes a non-reflective coated plate.

6. The defect inspection apparatus of claim 2, wherein the first spatial filter, the second spatial filter, and the third spatial filter respectively include apertures of different shapes.

7. The defect inspection apparatus of claim 1, further comprising at least one lens group disposed between the first to third units and the sample holder,
wherein each of the first inspection light, the second inspection light, and the third inspection light passes through the at least one lens group and is irradiated toward the sample holder.

8. The defect inspection apparatus of claim 7, further comprising a sensor-side optical filter through which light reflected from a surface of the sample among the first inspection light, light reflected from the surface of the sample among the second inspection light, and light reflected from the surface of the sample among the third inspection light pass, wherein the sensor-side optical filter is adjacent to the camera.

9. The defect inspection apparatus of claim 8, wherein the light reflected from the surface of the sample among the first inspection light, the light reflected from the surface of the sample among the second inspection light, and the light reflected from the surface of the sample among the third inspection light are bent by a beam splitter to progress toward the sensor-side optical filter.

10. The defect inspection apparatus of claim 1, wherein the camera generates the first image of the sample based on a signal obtained from the first section, generates the second image of the sample based on a signal obtained from the second section, and generates the third image of the sample based on a signal obtained from the third section.

11. The defect inspection apparatus of claim 10, wherein, when a defect is included in the sample, an image of the defect included in the first image, an image of the defect included in the second image, and an image of the defect included in the third image are different from each other.

12. The defect inspection apparatus of claim 11, wherein the first image includes an image in which the defect appears relatively bright, and surroundings of the defect appears relatively dark, the second image includes an image in which the defect appears relatively dark, and surroundings of the defect appears relatively bright, and the third image includes an image in which the defect appears relatively three-dimensional.

13. The defect inspection apparatus of claim 11, wherein the detector detects a position of the defect based on the first image, the second image, and the third image.

14. The defect inspection apparatus of claim 1, wherein the single image sensor further includes a dummy section disposed between two adjacent sections among the first section, the second section, and the third section.

* * * * *